United States Patent [19]

Ichikawa et al.

[11] Patent Number: 5,098,784
[45] Date of Patent: Mar. 24, 1992

[54] SUPPORTS FOR GAS CHROMATOGRAPHY COMPRISING AGGREGATES OF FINELY DIVIDED CARBON PARTICLES AND PROCESS FOR PREPARING THE SAME

[75] Inventors: Hiroshi Ichikawa; Akira Yokoyama; Keiichi Hirata, all of Yokohama; Hiroo Wada; Kenzo Kotera, both of Kyoto, all of Japan

[73] Assignees: Shinwa Chemical Industries Ltd, Kyoto; Nippon Carbon Co., Ltd., Tokyo, both of Japan

[21] Appl. No.: 637,375

[22] Filed: Jan. 4, 1991

[30] Foreign Application Priority Data

Jan. 17, 1990 [JP] Japan ..................................... 2-7684

[51] Int. Cl.$^5$ ......................... B01D 15/08; B05D 3/14
[52] U.S. Cl. ..................... 428/332; 428/407; 55/386; 210/198.2; 210/656
[58] Field of Search ................. 428/332, 407; 55/386; 210/198.2, 656

[56] References Cited

U.S. PATENT DOCUMENTS

| | | | |
|---|---|---|---|
| 4,504,547 | 3/1985 | Horodmiceanu et al. | 428/407 |
| 4,517,241 | 5/1985 | Alpert | 428/407 |
| 4,767,670 | 8/1988 | Cox et al. | 428/407 |
| 4,882,226 | 11/1989 | Schutyser et al. | 428/407 |

*Primary Examiner*—Edith L. Buffalow
*Attorney, Agent, or Firm*—Bucknam and Archer

[57] ABSTRACT

Supports for gas chromatography comprising aggregates of finely divided carbon particles, said aggregates having a bulk specific gravity of 0.2 to 0.5 and a specific surface area of not more than 1.0 m$^2$/g and being produced by coating finely divided particles, such as carbon powder, having a diameter of 100 μm or less and a content of particles having a diameter of 5 μm or less of 20% or less, with a liquid thermosetting resin, and subjecting the coated particles to forming, curing, heat-treating, dividing and classifying; and a process for preparing said supports.

2 Claims, 4 Drawing Sheets

1: ACETONE
2: DEHYDROEPIANDROSTERONE
3: CHOLESTEROL

TEMPERATURE: 280 °C
FLOW RATE OF NITROGEN: 50 ml/min
COLUMN LENGTH: 1m
GAS CHROMATOGRAPH
GC-14A MANUFACTURED BY SHIMADZU CORP.

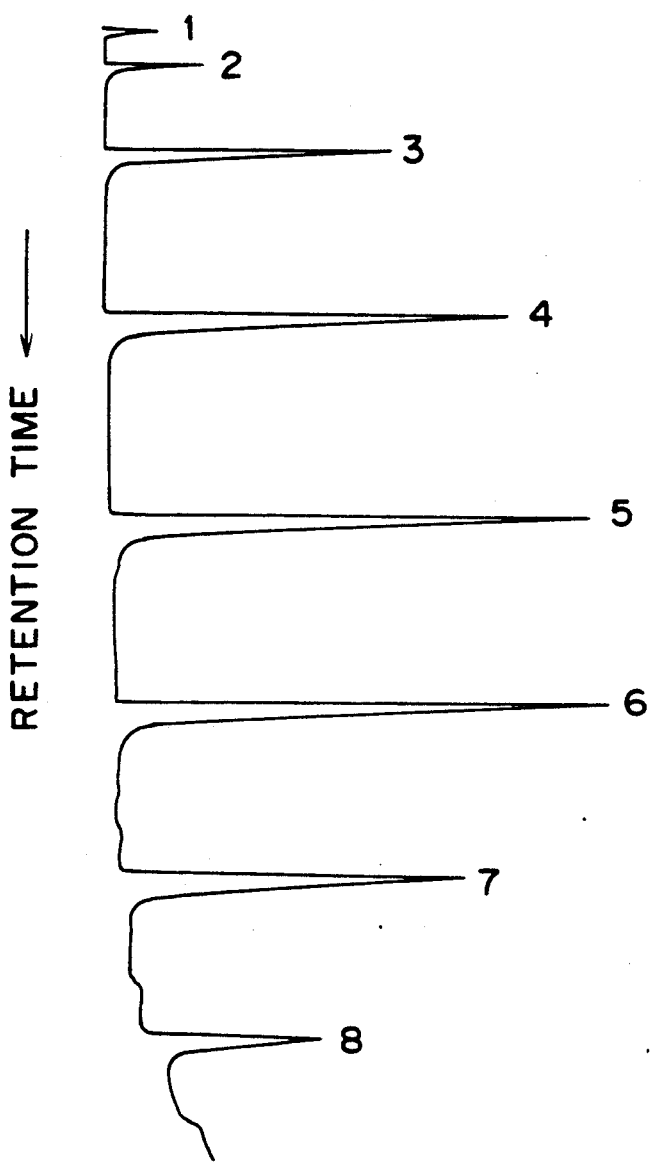
1: WATER
2~8: PEG-300
TEMPERATURE: 150 → 300°C, 5 °C/min
FLOW RATE OF NITROGEN: 50 ml/min
COLUMN LENGTH: 1m
GAS CHROMATOGRAPH
GC-14A MANUFACTURED BY SHIMADZU CORP.
F I G. 2

SUPPORTS FOR GAS CHROMATOGRAPHY COMPRISING AGGREGATES OF FINELY DIVIDED CARBON PARTICLES AND PROCESS FOR PREPARING THE SAME

BACKGROUND OF THE INVENTION

1. Field of the Invention

The present invention relates to supports for gas chromatography comprising aggregates of finely divided carbon particles usable for a wide range of analyses particularly including an analysis of an aqueous solution containing a high-boiling component, and to a process for preparing the same.

2. Prior Art

Supports prepared by sintering natural diatomaceous earth and then treating the sinter with an acid and a silanizing agent have widely been used as those for gas chromatography.

This is because the diatomaceous earth has a large capability of supporting a liquid phase thereon and a small adsorptivity (adsorption capability).

Further, in recent years, carbon type supports have come to be used as well.

The carbon type supports comprise carbon as the base material and therefore have features unattainably by the diatomaceous earth type supports, such as good chemical stability, excellent resistance to heat, water and chemicals and strength superior to that of the diatomaceous earth, and further have an advantage that the variations in one lot and among different lots are very small.

However, since the diatomaceous earth is a natural product, it is disadvantageous in that it brings about a wide variation, lacks the reproducibility between lots, is susceptible to hydrolysis, brings about cracking due to hydrolysis, and develops new adsorption sites, which lowers the performance. Further, it has drawbacks such that the upper limit of the heat resistance is as low as 325° to 350° C. for the diatomaceous earth treated with an inert acid and a silanizing agent.

On the other hand, the carbon type supports have a drawback that in the case of, for example, activated carbon or a heat-treated porous thermosetting resin, the adsorptivity is unfavorably excessively large because most of the pores have a diameter of 1,000 Å or less.

Thus, the conventional supports are not satisfactory for use in gas chromatography, and therefore the development of novel supports for gas chromatography having a low adsorptivity, no variation and excellent heat resistance has been desired in the art.

SUMMARY OF THE INVENTION

An object of the present invention is to provide supports for gas chromatography which can overcome the above-described drawbacks.

In view of the above, the present inventors have made intensive studies with a view to solving the above-described problems and, as a result, have found that a wide range of analyses including an analysis of an aqueous solution containing a high-boiling component become possible through the use as supports for gas chromatography of aggregates of finely divided carbon particles (including carbonaceous and graphitic particles) which have a bulk specific gravity of 0.2 to 0.5 and a specific surface area of not more than 1.0 m$^2$/g as determined by the nitrogen gas adsorption method and which are prepared by adding a liquid thermosetting resin being carbonizable by heating and an organic solvent to finely divided particles selected from the group consisting of carbon powder, graphite powder and a powdery or spherical infusible thermosetting resin, thereby preparing a slurry, and subjecting the slurry to drying for solvent removal, forming, curing and heat-treating for carbonization, and then to dividing and classifying. The present invention is based on the above finding or discovery.

The support for gas chromatography of the present invention comprises an aggregate of finely divided carbon particles, said aggregate having a bulk specific gravity of 0.2 to 0.5 and a specific surface area of not more than 1.0 m$^2$/g as determined according to the nitrogen gas adsorption method and being produced by coating finely divided particles which are selected from the group consisting of carbon powder, graphite powder and a powdery or spherical infusible thermosetting resin being carbonizable by heating and which have a diameter of 100 μm or less and a content of particles having a diameter of 5 μm or less of 20% or less, with a liquid thermosetting resin being carbonizable by heating, and subjecting the coated particles to forming, curing and heat-treating for carbonization, and then to dividing and classifying.

Further, the process of the present invention for preparing the support for gas chromatography is characterized by adding 5 to 50 parts by weight of a liquid thermosetting resin being carbonizable by heating and at least 20 parts by weight of an organic solvent to 100 parts by weight of finely divided particles which are selected from the group consisting of carbon powder, graphite powder and a powdery or spherical infusible thermosetting resin being carbonizable by heating and which have a diameter of 100 μm or less and a content of particles having a diameter of 5 μm or less of 20% or less, thereby preparing a slurry, and subjecting the slurry to drying, forming, curing and heat-treating at a temperature of 1500° to 3000° C. for carbonization, and then to dividing and classifying.

This invention will be explained in more detail hereunder.

In the present invention, at the outset, 5 to 50 parts by weight of a liquid thermosetting resin being carbonizable by heating and at least 20 parts by weight of an organic solvent are added to 100 parts by weight of finely divided particles selected from the group consisting of carbon powder, graphite powder and a powdery or spherical infusible thermosetting resin being carbonizable by heating and having a diameter of 100 μm or less and a content of particles having a diameter of 5 μm or less of 20% or less, thereby preparing a slurry.

The carbon powder or graphite powder used herein as the finely divided particles is preferably one prepared by heat-treating petroleum coke or coal coke to make it carbonaceous or graphitic material, and dividing the material. The powdery or spherical infusible thermosetting resin which is carbonizable by heating include phenol and modified phenol.

In a case where the particle diameter of the finely divided particles exceeds 100 μm, the resultant aggregate of finely divided carbon particles has a bulk specific gravity exceeding 0.5, so that the surface area lowers. In a case where the content of particles having a diameter of 5 μm or less exceeds 20%, the resultant aggregate has a specific surface area exceeding 1 m$^2$/g and an excessively high adsorptivity. In both the above cases, the separation ability of the resultant aggregate lowers unfavorably.

The liquid thermosetting resins which are carbonizable by heating include phenol, modified phenol, furan and urea.

The organic solvents include methanol, ethanol and acetone.

These components are preferably used respectively in the above-described amount ranges. In a case where the amount of the liquid thermosetting resin is less than the lower limit, the strength of the aggregate lowers, while in a case where the amount exceeds the upper limit, the bulk specific gravity of the aggregate exceeds 0.5 and the separation ability thereof lowers unfavorably. In a case where the amount of the organic solvent is less than the lower limit, the coating of the finely divided particles with a liquid thermosetting resin becomes heterogeneous, which brings about a lowering in the strength of the aggregate.

Then, the slurry is dried to remove the solvent, thus causing the finely divided particles to be homogeneously coated with the resin liquid.

In this case, it is preferred to dry the slurry in vacuo in such a temperature range that the resin does not cure.

The resin-coated particles are then formed. The forming may be conducted by methods such as one wherein the material is extruded through a nozzle to form a rod and one wherein use is made of a mold with the extrusion forming being particularly preferred from the viewpoint of dividability of the formed product.

The reason why the forming is conducted prior to the heat treatment is that the heat treatment of the ascoated particles causes the resultant aggregate to become heterogeneous.

The formed product is cured at a temperature of 100° to 200° C., heat-treated at a temperature of 1500° to 3000° C. for carbonization, divided, and then classified to prepare granular aggregates of finely divided carbonaceous particles, the aggregates having a diameter of, for example, 100 to 300 μm.

The aggregate of finely divided carbon particles thus prepared has a structure comprising skeletal particulates (finely divided carbon particles) having a diameter of 5 to 100 μm which are bonded to each other through a carbonized resin, a bulk specific gravity of 0.2 to 0.5 and a specific surface area of not more than 1.0 $m^2/g$, and therefore, the aggregate is suitable as a support for gas chromatography.

BRIEF DESCRIPTION OF THE DRAWINGS

FIGS. 1 to 4 are each an example of a gas chromatogram obtained in the analysis of various compounds wherein use is made of aggregates of finely divided carbon particles of the present invention.

PREFERRED EMBODIMENTS OF THE INVENTION

The present invention will be described in more detail by way of the following Examples and Comparative Examples, though it is not limited to these Examples only.

EXAMPLE 1

One hundred (100) g of a phenol resin liquid (trade name: TD-753S; produced by Dainippon Ink & Chemicals, Inc., Japan) and 300 g of methanol were added to 500 g of graphite powder regulated to have a particle diameter of 30 μm or less and a content of particles having a diameter of 5 μm or less of 7% (produced by Nippon Carbon Co., Ltd., Japan), thereby preparing a slurry. The slurry was dried in vacuo to remove methanol.

The resultant phenol resin-coated graphite powder was extruded through a nozzle having a pore diameter of 0.2 mmφ to form a rod. The rod was heated at 150° C. for 2 hrs. for curing and then heat-treated at 2000° C. The heat-treated product was divided and classified to prepare aggregates of finely divided carbon particles, the aggregates being regulated to have a grain size of 60 to 100 mesh (250 to 149 μm).

The aggregates had a bulk specific gravity of 0.31 and a specific surface area of 0.5 $m^2/g$ as determined by the nitrogen gas adsorption method.

Subsequently, 3% of OV-17 (produced by OHIO VALLEY SPECIALTY CHEMICAL, Inc.) as a silicone type liquid phase was supported on the aggregates, after which dehydroepiandrosterone and cholesterol which are each a kind of steroid were analyzed by using gas chromatography wherein the aggregates with OV-17 were used as the packing for the separation.

Figure 1:
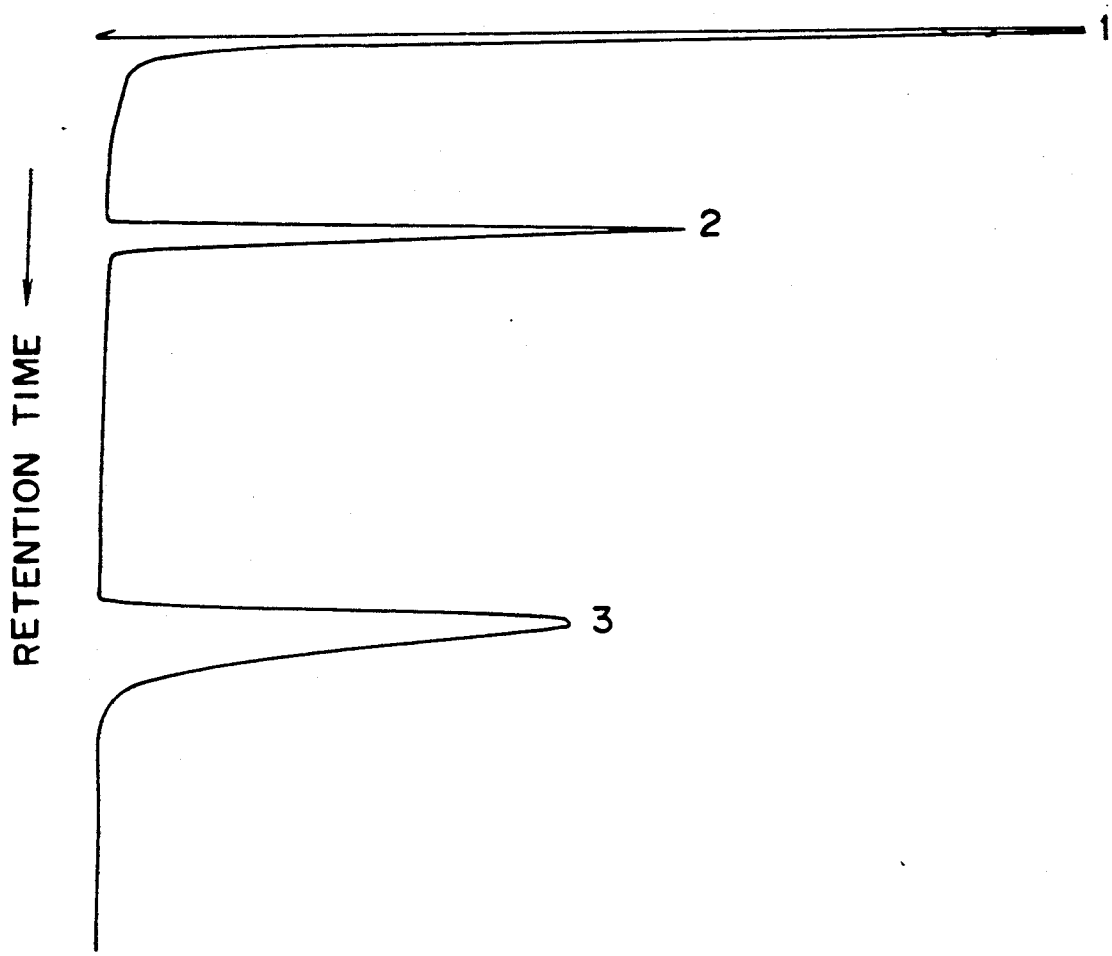

The gas chromatogram thus obtained is shown in FIG. 1.

As can be seen from FIG. 1, the above-described steroids can be successfully analyzed through the use of the supports of the present invention.

Then, an aqueous solution of polyethylene glycol-300 (PEG-300) was analyzed by using gas chromatography wherein the above-described packing was used. The chromatogram thus obtained is shown in FIG. 2.

As can be seen from FIG. 2, an aqueous solution of a high-boiling component, such as PEG-300, as well can be successfully analyzed through the use of the supports of the present invention.

COMPARATIVE EXAMPLE 1

Two types of commercially available porous polymer beads (divinylbenzene/polystyrene type) A and B were each made infusible at 260° C., heat-treated at 200° C. and then classified to prepare porous carbon beads regulated to have a particle size of 80 to 100 mesh (177 to 149 μm). The bulk specific gravity and specific surface area (as determined by the nitrogen gas adsorption method) of the porous carbon beads thus prepared were 0.76 and 14.5 $m^2/g$, respectively, in the case of the type A, and 0.79 and 11.4 $m^2/g$, respectively, in the case of the type B.

Three (3) % of OV-17 was supported on each type of the above-described porous carbon beads, after which the steroids (dehydroepiandrosterone and cholesterol) were analyzed by using the same manner as in Example 1, except that the carbon beads with OV-17 were substituted for the aggregates with OV-17. These packings, however, had such a large adsorptivity that the steroids could not be eluted.

EXAMPLE 2

Fifty (50) g of the same phenol resin liquid as in Example 1 and 300 g of methanol were added to 500 g of an infusible phenol resin particles (trade name: Univeks C-50; produced by Unitika Ltd., Japan) having a particle diameter of 100 μm or less and a content of particles having a diameter of 5 μm or less of 1.4%, thereby preparing a slurry. The slurry was treated in the same manner as that of Example 1, except that the pore diameter of the nozzle was 0.3 mm, thus preparing aggregates of finely divided carbon particles, the aggregates being regulated to have a grain size of 60 to 80 mesh (250 to 177 μm).

The aggregates of the present invention thus prepared had a bulk specific gravity of 0.35 and a specific surface area of 0.5 m²/g or less as determined by the nitrogen gas adsorption method.

Ten (10) % of polyethylene glycol 20M (molecular weight: about 20,000) was supported on the aggregates, after which an aqueous solution containing 100 ppm of $C_2$ to $C_7$ lower fatty acids was analyzed by using gas chromatography wherein the aggregates with polyethylene glycol were used as the packing for the separation.

Figure 3:
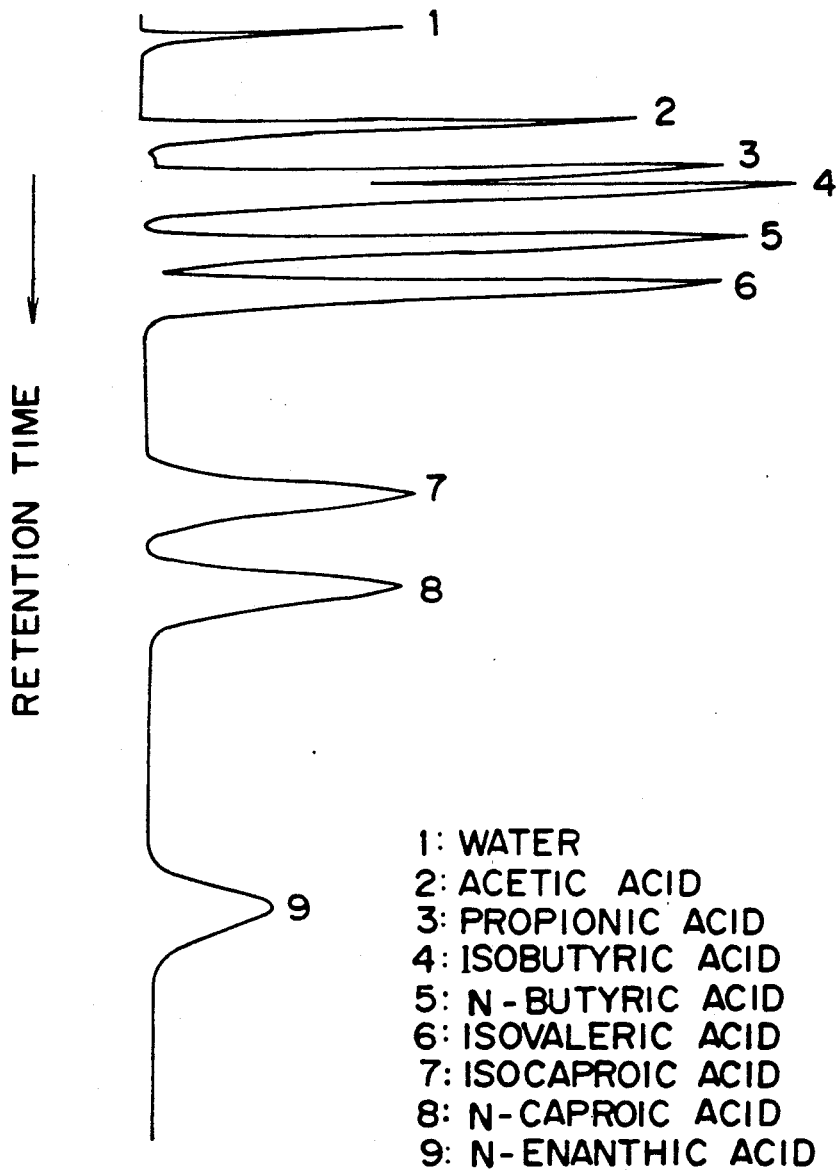

The gas chromatogram thus obtained is shown in FIG. 3.

As can be seen from FIG. 3, the lower fatty acids can be successfully analyzed through the use of the supports of the present invention as the packing.

In addition, since the conventional packings adsorb lower fatty acids, it was necessary to support an acid, e.g., phosphoric acid, on the packing for the purpose of preventing the adsorption, or to use acidic supports, for example, terephthalic acid type supports. By contrast, the supports of the present invention need no treatment such as supporting of an acid because they do not cause any adsorption as described above.

Further, in order to examine the water resistance of the supports of the present invention as a packing, 100 μl of water was poured into the chromatographic column after the above analysis, after which the aqueous solution of the lower fatty acids was analyzed again. The gas chromatogram thus obtained was quite the same as that shown in FIG. 3. That is, it has become apparent that the supports of the present invention have high water resistance as a packing.

EXAMPLE 3

Silicone GESE-30 (produced by General Electric Co.) was supported on the same supports (aggregates) of the present invention as in Example 2, after which nitrogen compounds as components of a remedy for the cold (o-ethoxybenzamide, phenacetin, caffeine, aminopyrin and chlorpheniramine maleate) were analyzed by using gas chromatography wherein the aggregates with Silicone GESE-30 were used as the packing for the separation.

Figure 4:
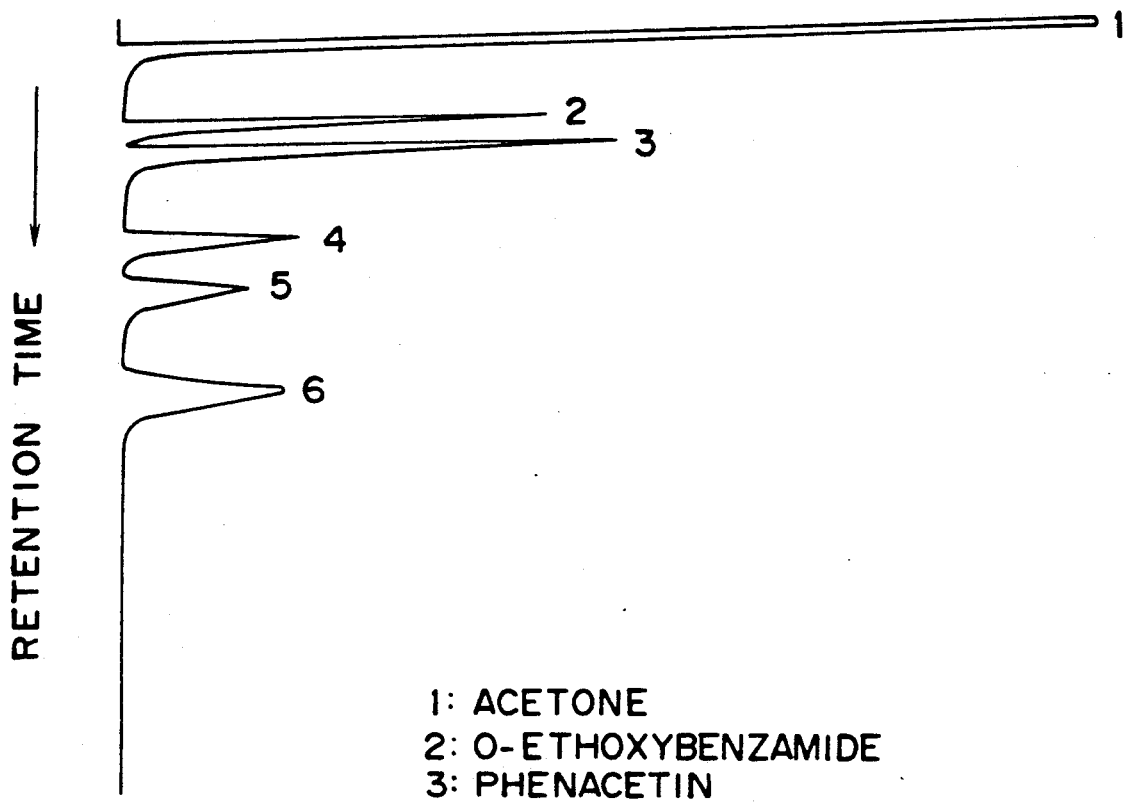

The chromatogram thus obtained is shown in FIG. 4.

As can be seen from FIG. 4, the above-described amines can be successfully analyzed through the use of the supports of the present invention.

EXAMPLE 4

Two hundreds (200) g of a furan resin liquid (commercially available product) and 400 g of acetone were added to 500 g of carbon powder regulated to have a particle diameter of 40 μm or less and a content of particles of 5 μm or less of 2% (produced by Nippon Carbon Co., Ltd., Japan), thereby preparing a slurry. The slurry was dried in vacuo to remove acetone, thus obtaining a furan resin-coated carbon powder. The obtained powder was molded to form a pellet having a size of 1φ×5 mm. The pellet was heat-cured at 150° C. for 2 hrs. and then heat-treated at 2500° C.

The heat-treated pellet was then divided and classified to prepare aggregates of finely divided carbon particles, the aggregates being regulated to have a grain size of 60 to 100 mesh (250 to 149 μm). The aggregates had a bulk specific gravity of 0.28 and a specific surface area of 0.3 m²/g as determined by the gas adsorption method.

The steroids (dehydroepiandrosterone and cholesterol) were analyzed by using the same manner as in Example 1, except that the supports (aggregates) of the present invention thus prepared in Example 4 were substituted for those in Example 1. As the result, the steroids were successfully analyzed.

COMPARATIVE EXAMPLE 2

Aggregates of finely divided carbon particles, the aggregates being regulated to have a grain size of 60 to 100 mesh (250 to 149 μm), were prepared in the same manner as in Example 1, except that the heat-treating was conducted at 1400° C. The aggregates had a bulk specific gravity of 0.31 and a specific surface area of 6.5 m²/g as determined by the gas adsorption method. The steroids (dehydroepiandrosterone and cholesterol) were analyzed by using the same manner as in Example 1, except that the aggregates obtained in this Comp. Ex. 2 were substituted for those in Example 1. However, the above aggregates were unsuitable for the analysis because the number of theoretical plates of peaks was remarkably lowered due to large adsorptivity of the packing.

COMPARATIVE EXAMPLE 3

Aggregates of finely divided carbon particles were prepared in the same manner as in Example 1, except that 100 g of the same phenol resin liquid as in Example 1 and 300 g of methanol were added to 500 g of graphite powder regulated to have a particle diameter of 40 μm or less and a content of particles having a diameter of 5 μm or less of 22%, thereby preparing a slurry. The aggregates had a bulk specific gravity of 0.29 and a specific surface area of 3.2 m²/g as determined by the gas adsorption method. The steroids (dehydroepiandrosterone and cholesterol) were analyzed by using the same manner as in Example 1, except that the aggregates obtained in this Comp. Ex. 3 were substituted for those in Example 1. However, the above aggregates were unsuitable for the analysis because the number of theoretical plates of peaks was remarkably lowered due to large adsorptivity of the packing.

COMPARATIVE EXAMPLE 4

Aggregates of finely divided carbon particles were prepared in the same manner as in Example 1, except that 100 g of the same phenol resin liquid as in Example 1 and 300 g of methanol were added to 500 g of graphite powder regulated to have a particle diameter of 105 to 177 μm, thereby preparing a slurry. The aggregates had a bulk specific gravity of 0.60 and a specific surface area of 0.1 m²/g as determined by the gas adsorption method. The steroids (dehydroepiandrosterone and cholesterol) were analyzed by using the same manner as in Example 1, except that the aggregates obtained in this Comp. Ex. 4 were substituted for those in Example 1. However, the above aggregates were unsuitable for the analysis because the number of theoretical plates of peaks was remarkably lowered. (Effects of the Invention)

Although the aggregates of finely divided carbon particles according to the present invention have a bulk specific gravity of 0.2 to 0.5, that is, much smaller than that of the conventional aggregates, they have little or no more having a diameter of 1000 Å or less causative of an increase in the adsorptivity, an adsorptivity at most on the same level as that of diatomaceous earth type supports, and a liquid phase supporting capability on the same level as that of diatomaceous earth type supports.

Therefore, not only the analysis of high-boiling components such as steroids and aqueous solutions of lower fatty acids and amines but also the analysis of aqueous solutions of high-boiling components which are hardly analyzable when the conventional supports are used becomes possible through the use, as supports for gas chromatography, of the aggregates of finely divided carbon particles according to the present invention with varied liquid phases.

What is claimed is:

1. A support for gas chromatography comprising an aggregate of finely divided carbon particles, said aggregate having a bulk specific gravity of 0.2 to 0.5 and a specific surface area of not more than 1.0 m$^2$/g as determined according to the nitrogen gas adsorption method and being produced by coating finely divided particles which are selected from the group consisting of carbon powder, graphite powder and a powdery or spherical infusible thermosetting resin being carbonizable by heating and which have a diameter of 100 μm or less and a content of particles having a diameter of 5 μm or less of 20% or less, with a liquid thermosetting resin being carbonizable by heating, and subjecting the coated particles to forming, curing and heat-treating for carbonization, and then to dividing and classifying.

2. A process for preparing a support for gas chromatography comprising an aggregate of finely divided carbon particles, said aggregate having a bulk specific gravity of 0.2 to 0.5 and a specific surface area of not more than 1.0 m$^2$/g as determined according to the nitrogen gas adsorption method, characterized by adding 5 to 50 parts by weight of a liquid thermosetting resin being carbonizable by heating and at least 20 parts by weight of an organic solvent to 100 parts by weight of finely divided particles which are selected from the group consisting of carbon powder, graphite powder and a powdery or spherical infusible thermosetting resin being carbonizable by heating and which have a diameter of 100 μm or less and a content of particles having a diameter of 5 μm or less of 20% or less, thereby preparing a slurry, and subjecting the slurry to drying, forming, curing and heat-treating at a temperature of 1500° to 3000° C. for carbonization, and then to dividing and classifying.

* * * * *